L. ASPY.
TRUCK.
APPLICATION FILED FEB. 28, 1912.

1,056,729.

Patented Mar. 18, 1913.

Witnesses
Carroll Bailey
John J. McCarthy

Inventor
Lotus Aspy.
By Victor J. Evans
Attorney

UNITED STATES PATENT OFFICE.

LOTUS ASPY, OF PARIS, MISSOURI.

TRUCK.

1,056,729.　　　Specification of Letters Patent.　　Patented Mar. 18, 1913.

Application filed February 28, 1912. Serial No. 680,416.

*To all whom it may concern:*

Be it known that I, LOTUS ASPY, a citizen of the United States of America, residing at Paris, in the county of Monroe and State of Missouri, have invented new and useful Improvements in Trucks, of which the following is a specification.

This invention relates to improvements in trucks and has particular application to hand operated trucks used in dwellings and store houses for moving articles of furniture, baggage and the like.

In carrying out my present invention, it is my purpose to provide a truck of the above-stated character which may be folded or collapsed when not in use thereby enabling the truck to be stored away in a relatively small space.

Furthermore, I aim to provide a truck of this class by means of which a stove or other article after being placed on the truck may be elevated or raised relatively thereto so that access may be had to the bottom of such article or a base-board or the like applied beneath the same.

It is also my purpose to provide a truck of the type above set forth which shall embody the desired features of simplicity, durability, strength and efficiency, and which may be manufactured at a relatively low cost.

With the above and other objects in view, the invention consists in the construction, combination and arrangement of parts hereinafter set forth in and falling within the scope of the appended claims.

Figure 1:
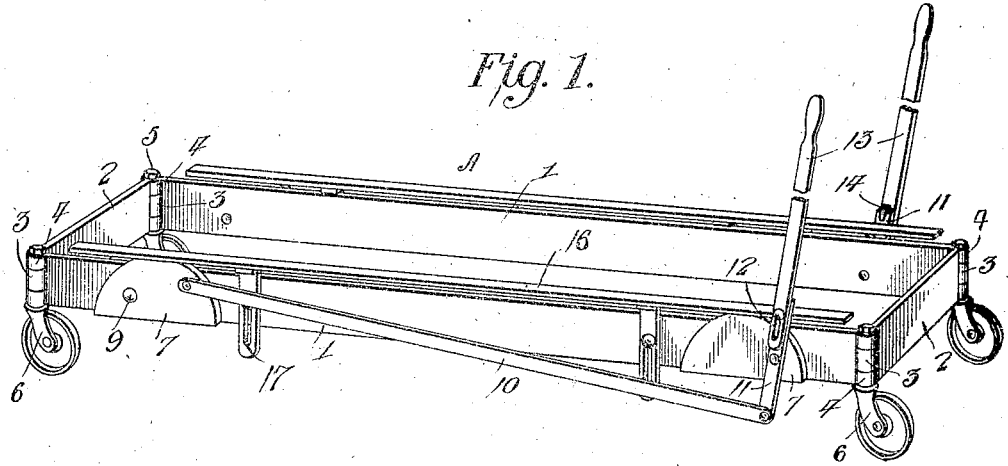
Figure 2:
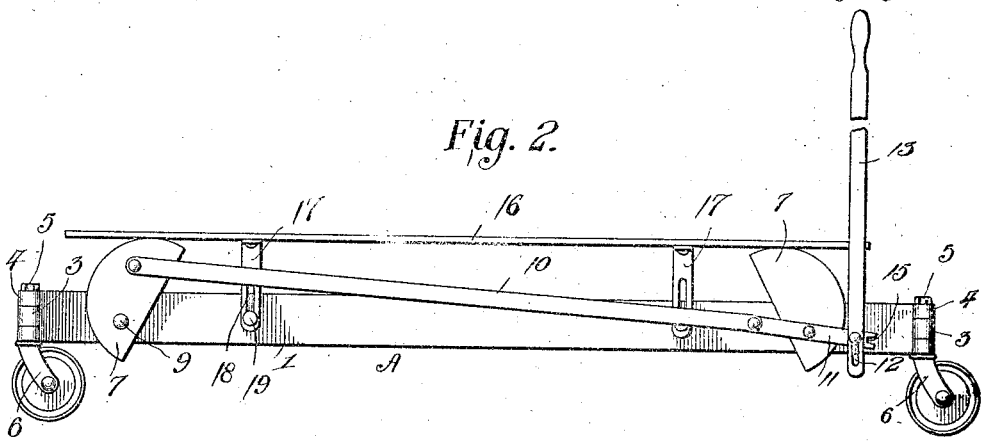
Figure 3:
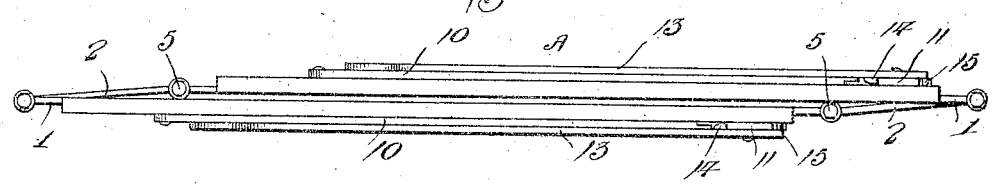
Figure 4:
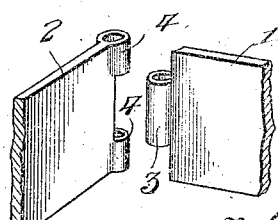

In the accompanying drawing wherein has been illustrated one embodiment of the invention, Figure 1 is a perspective view of a truck constructed in accordance with the present invention. Fig. 2 is a side elevation showing the lifting mechanism of the truck in elevated position. Fig. 3 is a top plan view illustrating the truck in its folded position, and Fig. 4 is a fragmentary perspective view of one of the joints of the truck frame.

Similar reference characters designate like parts throughout the several views.

Referring now to the accompanying drawing in detail, the truck embodies the frame A which is adapted to be folded or collapsed and consists of longitudinal side bars 1, 1 and transverse end bars 2, 2 pivotally connected to the bars first mentioned so that the frame may be collapsed or knocked down to facilitate convenient storing of the truck, such pivotal connections consisting, in the present instance, of knuckles 3 integral with the opposite ends of the side bars and of a less height than that of the side bars, and ears 4, 4 integral with the upper and lower edges of the end bars at the corners thereof and provided with openings alining with the opening in each knuckle, a pivot pin 5 being inserted through such alining openings. Thus, it will be seen that the side bars of the frame A may be moved toward and away from each other to fold and distend the frame. Connected to the lower ends of the pivot pins 5 are casters 6, the pivot pins being movable relatively to the knuckles and ears 3 and 4 respectively so that the casters may have universal movement.

In order to elevate an article while upon the truck so that the article may be moved with ease from place to place and access had to the bottom of such article, I have provided a lifting or elevating mechanism which includes a plurality of semicircular shaped blocks 7, one of such blocks being arranged at each end of each of the longitudinal side bars. These blocks, as shown, are pivoted eccentrically as at 9 to the respective ends of the side bars and the blocks of each pair are interconnected through the medium of a link 10 and a short lever 11 so that the said blocks may be moved about their pivotal connections with the side bars simultaneously, the levers 11 being fixed to their respective blocks to rotate the same. Connected to the free ends of each lever 11 through the medium of a pin and slot connection 12 is an operating lever 13 provided with an offset lug 14 adapted to engage a recess or depression 15 formed in the proximate end of the lever 11 so that the levers 11 and 13 may present, in effect, a rigid structure whereby in the movement of the operating lever, the levers 11 and links 10 will be actuated to impart movement to the lifting blocks so that the latter may be rotated about their pivots into an operative or elevated position, as shown in Fig. 2 of the drawing. After this movement of the parts, the lug 14 is withdrawn from engagement with the recess 15, owing to the pin and slot connection 12 and the lever 13 brought to a perpendicular position. Slidably mounted vertically relatively to each side bar 1 of the frame A, is a supporting member comprising a longitudinal supporting bar 16 provided with a pair of depending guide straps 17 each formed with an elongated slot 18 designed to receive a pin 19 carried by the respective bar of the frame, the ends of the supporting bar being disposed above and in engagement with the lifting blocks so that in the movement of the latter the supporting bar may be elevated thereby lifting the article upon the truck.

From the above description taken in connection with the accompanying drawing, the construction and mode of operation of my invention will be readily apparent, and while I have herein shown and described one embodiment of my invention, by way of illustration, I desire to have it understood that I do not limit myself to all of the details of construction herein described and delineated, as modification and variation may be made within the scope of the claims and without departing from the spirit of the invention.

I claim:

1. In a transporting truck, a frame comprising longitudinal side bars and transverse end bars, an elevating mechanism upon the frame and consisting of a pair of blocks pivoted eccentrically to each side bar adjacent to the opposite ends thereof, links and short levers interconnecting the blocks of each pair, operating levers, a pin and slot connection between each operating lever and the respective short lever, and means for effecting a rigid connection between the said operating levers and said short levers whereby the blocks may be moved about their pivotal connections with the side bars of the frame, and a supporting member under the control of each pair of blocks.

2. In a transporting truck, a frame comprising longitudinal side and transverse end bars, a lifting mechanism consisting of a pair of blocks pivoted eccentrically to each longitudinal side bar adjacent to the opposite ends thereof, links and short levers interconnecting the blocks of each pair, said short levers having slotted ends, operating levers, a pin and slot connection between each operating lever and the respective short lever, and a lug carried by each operating lever and adapted to engage the slotted end of the respective short lever to effect a rigid connection between the operating levers and the short levers, a longitudinal supporting bar mounted above each longitudinal side bar of the frame, guide straps depending from each supporting bar and formed with elongated slots, and pins carried by the longitudinal bars of the frame and passed through said slots, said supporting bars being disposed above the respective blocks and adapted to be elevated and lowered according to the movement of the blocks under the action of the operating levers.

3. In a transporting truck, a frame comprising longitudinal side and transverse end bars, a lifting mechanism consisting of a pair of blocks pivoted eccentrically to each longitudinal side bar adjacent to the opposite ends thereof, links and short levers interconnecting the blocks of each pair, said short levers having slotted ends, an operating lever, a pin and slot connection between each operating lever and the respective short lever, and a lug carried by each operating lever and adapted to engage the slotted end of the respective short lever to effect a rigid connection between the operating levers and the short levers, a longitudinal supporting bar mounted above each longitudinal side bar of the frame, guide straps depending from each supporting bar and formed with elongated slots, pins carried by the longitudinal bars of the frame and passed through said slots, said supporting bars being disposed above the respective blocks and adapted to be elevated and lowered according to the movement of the blocks under the action of the operating levers, and pivotal connections between the longitudinal side and transverse end bars of the frame whereby one side and end bar may be folded upon the other side and end bar in the knocked-down position of the truck.

In testimony whereof I affix my signature in presence of two witnesses.

LOTUS ASPY.

Witnesses:
J. T. MATCHET,
H. W. LEAVITT.